(12) United States Patent
Vithana

(10) Patent No.: US 12,399,402 B2
(45) Date of Patent: Aug. 26, 2025

(54) LIQUID CRYSTAL ALIGNMENT QUALITY AND STABILITY

(71) Applicant: Snap Inc., Santa Monica, CA (US)

(72) Inventor: Hemasiri K. Vithana, Chandler, AZ (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/664,986

(22) Filed: May 15, 2024

(65) Prior Publication Data

US 2024/0411183 A1    Dec. 12, 2024

Related U.S. Application Data

(60) Provisional application No. 63/506,970, filed on Jun. 8, 2023.

(51) Int. Cl.
| | |
|---|---|
| *G02F 1/1337* | (2006.01) |
| *C09K 19/02* | (2006.01) |
| *G02F 1/137* | (2006.01) |
| *G02F 1/139* | (2006.01) |

(52) U.S. Cl.
CPC .... *G02F 1/133703* (2013.01); *C09K 19/0208* (2013.01); *G02F 1/13712* (2021.01); *G02F 1/1396* (2013.01)

(58) Field of Classification Search
CPC .......... G02F 1/133703; G02F 1/13712; G02F 1/1396; C09K 19/0208
See application file for complete search history.

(56) References Cited

U.S. PATENT DOCUMENTS

| | | | | |
|---|---|---|---|---|
| 2007/0116901 A1* | 5/2007 | Kubota | .................. | B82Y 30/00 |
| | | | | 252/299.5 |
| 2016/0152896 A1* | 6/2016 | Kwon | .................. | C09K 19/406 |
| | | | | 252/299.4 |

FOREIGN PATENT DOCUMENTS

CN    110928056    3/2020

OTHER PUBLICATIONS

"International Application Serial No. PCT/US2024/029674, International Search Report mailed Sep. 26, 2024", 3 pgs.
"International Application Serial No. PCT/US2024/029674, Written Opinion mailed Sep. 26, 2024", 5 pgs.

* cited by examiner

*Primary Examiner* — Charles S Chang
(74) *Attorney, Agent, or Firm* — Schwegman Lundberg & Woessner, P.A.

(57) ABSTRACT

A method for manufacturing a liquid crystal (LC) display includes determining an amount of an LC material to be used in the LC display, determining a silane material to be mixed with the LC material and an amount of the silane material to be mixed with the LC material based on the LC material and the amount of the LC material, mixing the amount of the silane material with the amount of the LC material to generate an LC mixture, and heat treating the LC mixture in contact with a display substrate to bond at least a portion of the silane material to one or more surfaces of the display substrate, such that the silane material acts as a surfactant. The amount of the silane material may constitute at least 0.8% of the LC mixture by weight.

20 Claims, 9 Drawing Sheets

LIQUID CRYSTAL ALIGNMENT QUALITY AND STABILITY

CROSS-REFERENCE TO RELATED APPLICATION

This patent application claims the benefit of U.S. Provisional Patent Application No. 63/506,970, filed Jun. 8, 2023, entitled "IMPROVED LIQUID CRYSTAL ALIGNMENT QUALITY AND STABILITY", which is incorporated by reference herein in its entirety.

TECHNICAL FIELD

The present disclosure relates generally to display devices and more particularly to nematic liquid crystal and chiral nematic liquid crystal spatial light modulators.

BACKGROUND

Liquid crystal spatial light modulators (SLMs) for imaging applications include SLMs that use ferroelectric liquid crystals, SLMs that use nematic liquid crystals, and SLMs that use chiral nematic liquid crystals. The liquid crystal in the nematic types can have positive or negative dielectric anisotropies. SLMs using nematic liquid crystals or chiral nematic liquid crystals with a negative dielectric anisotropy use electro-optic modes, which include the vertically aligned nematic (VAN) display mode and the twisted vertically aligned nematic (TVAN) display mode and typically have higher contrast ratios. Among those two optical modes, TVAN optical mode has the highest contrast ratio and is preferred for projection applications and near-to-eye applications, such as in mixed reality (MR) (e.g., augmented reality and virtual reality) headsets. TVAN optical modes are described in U.S. Pat. Nos. 8,724,059 and 9,551,901, which are incorporated herein by reference.

SLMs using nematic liquid crystals or chiral nematic liquid crystals with a negative dielectric anisotropy, operating in a VAN or TVAN display mode, present various technical problems. Fast switching speed, high brightness, high contrast, and low power consumption are all desirable operating properties that require use of specific LC materials and specific SLM designs, some of which present sensitivities and instabilities that may reduce the reliability or robustness of the display.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
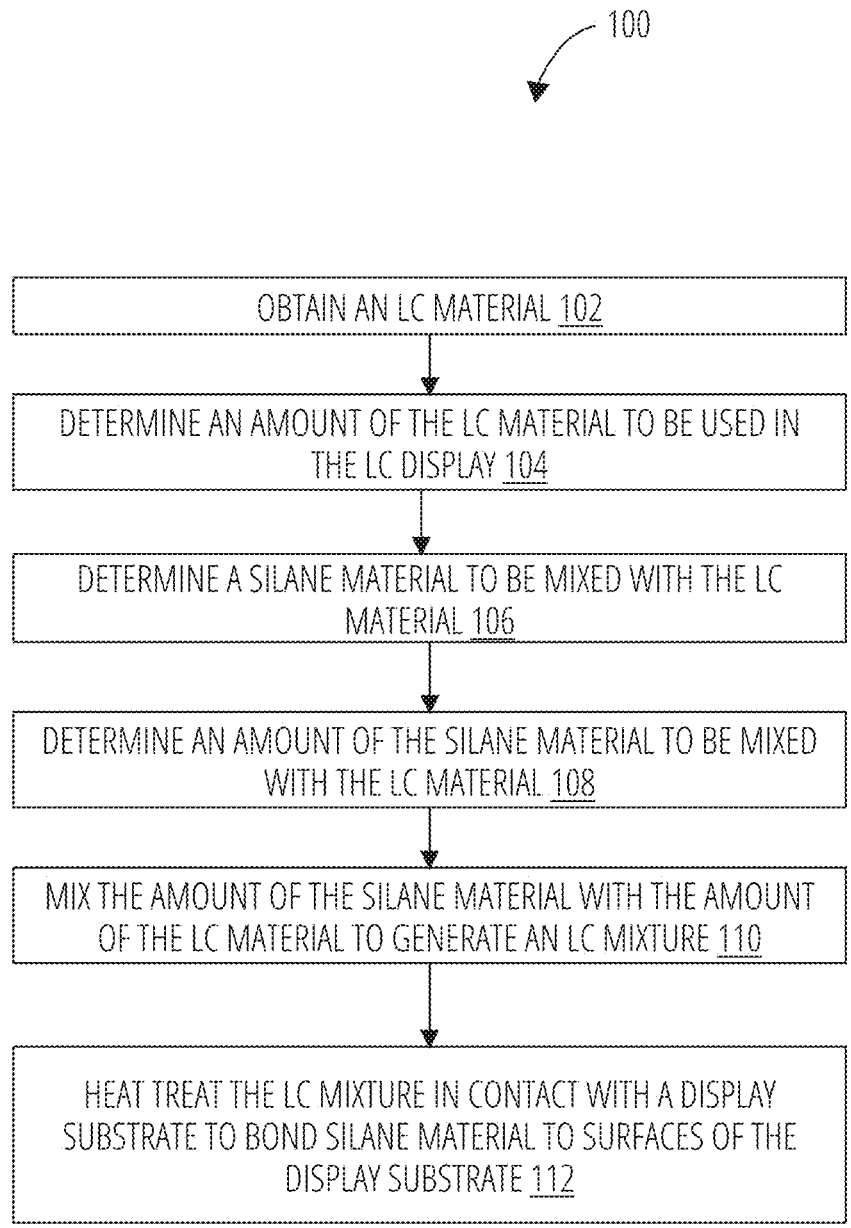
FIG. 1 illustrates a method for manufacturing a liquid crystal (LC) display, in accordance with some examples.

In some examples disclosed herein, LC display manufacturing methods, LC mixtures, and LC displays are provided that may provide improved LC alignment quality and stability relative to conventional techniques or conditions. An amount of a silane material is mixed with an amount of an LC material to produce an LC mixture containing a relatively large concentration of the silane material, such as (in various examples) greater than 0.8%, between 0.8% and 1.2%, or approximately 1% silane material. During heat treatment of the LC mixture, which may involve heat treatment at a temperature of approximately 110 C for approximately one hour, the silane material bonds to surfaces of a display substrate and thereby creates a layer of silane material between the substrate and the LC material, such that the silane material acts as a surfactant. In some examples, the amount of the silane material may be selected to ensure that the silane material bonds to the surfaces of the substrate and does not leave an excess amount of silane material mixed with the LC material, even though such excess silane material may not have a material effect on the operation of the LC material at low concentrations.

The silane material may, in some examples, include or constitute one or more of the following: an n-octadecyldimethylmethoxy silane, an n-octadecylmethyldimethoxy silane, an n-octadecyltrimethoxy silane, an n-octadecylmethyldiethoxy silane, an n-octadecyltriethoxyl silane, an octadecydimethyl(3-trimethoxysilyil-propyl)ammonium chloride, a 1,2-bis(trimethoxysilyl)decane, or a 1-n-decyl-1,1,3,3,3-pentamethoxy-1,3-disilapropane.

The use of a silane material at the specified concentrations may exhibit one or more beneficial effects. As described above, some optical applications (such as near-to-eye mixed reality displays) may require that an LC display exhibits a fast switching speed in order to implement a color-sequential display. The need for a fast switching speed may require the use of a display having a narrow or thin cell gap. These optical applications may also require relatively high brightness and contrast. In the context of a display having a thin cell gap, an LC material having a high birefringence may need to be used to form the LC display. To achieve the needed high contrast, the LC display may need to operate in a vertically aligned nematic (VAN) display mode, or even more advantageously with respect to contrast, a twisted vertically aligned nematic (TVAN) display mode. In a TVAN or VAN display mode, the LC molecules are aligned nearly perpendicular to the substrate surfaces, with a twist. The dielectric anisotropy of the LC material is negative in a TVAN display mode ($\Delta\varepsilon=\varepsilon(n)-\varepsilon(o)$).

To satisfy these requirements, in some examples, a display may need to exhibit a switching speed of, e.g., <500 μsec in order to avoid any color bleeding and motion defects. The display may need to have a cell gap of approximately 0.8 to 1.1 μm. The LC material in the display may need to exhibit LC birefringence of, e.g., >0.19. If a thinner cell gap and/or a lower birefringence is used, brightness can be increased by increasing the LED current, but this will result in greater power consumption. In some examples, an LC display designed to satisfy these requirements may be implemented using a TVAN optical mode, with a thin cell gap, and using LC material with a high birefringence.

However, using high birefringent LC materials with negative dielectric anisotropy may present technical problems. It may be difficult to achieve LC alignment with good uniformity. Some high birefringent LC materials with negative dielectric anisotropy have relatively low environmental stability: they are unstable against, e.g., extremes of humidity and/or temperature. Furthermore, such LC materials tend to have low anchoring transition temperatures, such that the alignment of the LC material changes with increasing temperature. An anchoring transition temperature is the temperature at which the LC molecules change their alignment configuration, e.g., from nearly perpendicular to a display substrate to nearly parallel to the display substrate.

Various examples attempt to address one or more of these technical problems by adding a surfactant material to the LC material. A surfactant tends to reduce the surface tension of a liquid in which it is dissolved. The surfactant material added to the LC material may act to modify properties of the surfaces it comes in contact with, thereby potentially addressing one or more of the technical problems identified above.

In some examples, the surfactant material may be selected based on an ability of the surfactant material to chemically bond on to a desired surface, e.g., a surface of a display substrate used to contain the LC material of the LC display. In some examples, a silane material, such as a long chain silane, may be selected as the surfactant material. Various other factors may also be considered in selecting a suitable silane. First, it may be desirable for the silane to have a long alkyl chain, to promote or improve the quality of the desired LC alignment (e.g., nearly perpendicular alignment). This may in turn elevate the anchoring transition temperature. Second, it may be desirable for the silane to be very hydrophobic or moisture repellent in order to improve environmental stability. Third, it may be desirable for the silane to not alter the electro-optic performance of the display if excess amounts of silane remain mixed with the LC material after manufacture. Based on one or more of these factors, suitable long chain silanes have been identified by experimental testing described herein. These silanes include an n-octadecyldimethylmethoxy silane, an n-octadecylmethyldimethoxy silane, an n-octadecyltrimethoxy silane, an n-octadecylmethyldiethoxy silane, an n-octadecyltriethoxyl silane, an octadecydimethyl(3-trimethoxysilyil-propyl)ammonium chloride, a 1,2-bis(trimethoxysilyl)decane, and a 1-n-decyl-1,1,3,3,3-pentamethoxy-1,3-disilapropane.

In some examples, an LC mixture incorporating a relatively large concentration (e.g., 1%) of a highly hydrophobic silane (such as those identified above) may be used to effectively coat alignment layers and bond with substrate surfaces of the LC display, and may be particularly effective in the manufacture of very small LC displays, such as LC displays on the order of 1 cm square in area. Such displays, which may be used for demanding optical applications such as near-to-eye mixed reality displays, may have very small cell gaps (e.g., on the order of 1 μm) and may require high brightness, high contrast, and fast switching time to effectively project a full-color, high-quality moving image to a viewer.

Examples of surfactant materials, LC mixtures, LC displays, and methods for manufacture thereof are described herein with respect to various examples. Other technical features may be readily apparent to one skilled in the art from the following figures, descriptions, and claims.

FIG. 1 shows operations of a method 100 for manufacturing a liquid crystal (LC) display. In some examples, the LC display is or includes a spatial light modulator configured to operate in a vertically aligned nematic (VAN) display mode. In some examples, the LC display is or includes a spatial light modulator configured to operate in a twisted vertically aligned nematic (TVAN) display mode.

Although the example method 100 depicts a particular sequence of operations, the sequence may be altered without departing from the scope of the present disclosure. For example, some of the operations depicted may be performed in parallel or in a different sequence that does not materially affect the function of the method 100. In other examples, different components of an example device or system that implements the method 100 may perform functions at substantially the same time or in a specific sequence.

At operation 102, an LC material is obtained. As described above, in some examples the LC material is or includes a nematic LC material with a negative dielectric anisotropy.

At operation 104, an amount of the LC material to be used in the LC display is determined. The amount of LC material to be used in the LC display is typically dictated by the structural design of the LC display.

At operation 106, a silane material to be mixed with the LC material is determined. As described above, various factors may be taken into account in this determination: e.g., when the LC material is a nematic LC material with a negative dielectric anisotropy, the factors to be taken into account may include an ability of the silane material to chemically bond on to a desired surface, the length of an alkyl chain of the silane material, the hydrophobic or moisture repellent properties of the silane material, the tendency of the silane material to not alter the electro-optic performance of the display, etc.

In some examples, the molecular structure of the silane material includes two major components. First, the molecules of the silane material include a silane pendant group attached to a silicon (Si) atom, which chemically binds the silane molecule to the surfaces of the display substrate. Second, the molecules of the silane material include an alkyl chain attached to the silicon atom. Silane pendant groups in these silane molecules may consist of one or more $OCH_3$ groups or $OC_2H_5$ groups. If the number of pendant groups is less than three, then the rest of the bonds of the Si atom may have $CH_2$ groups attached to them. The alkyl chain may consist of a chain of $CH_2$ groups, wherein the last group is a $CH_3$ group. The length of the alkyl chain is defined by the number of carbon (C) atoms in the alkyl chain; the longer the length of the alkyl chain, the higher the hydrophobicity of the display substrate surface after bonding with the corresponding silane. In some examples, the silane material may have silane molecules having one or more silane pendant groups and an alkyl chain length of 8 or more carbon atoms.

Figure 2:
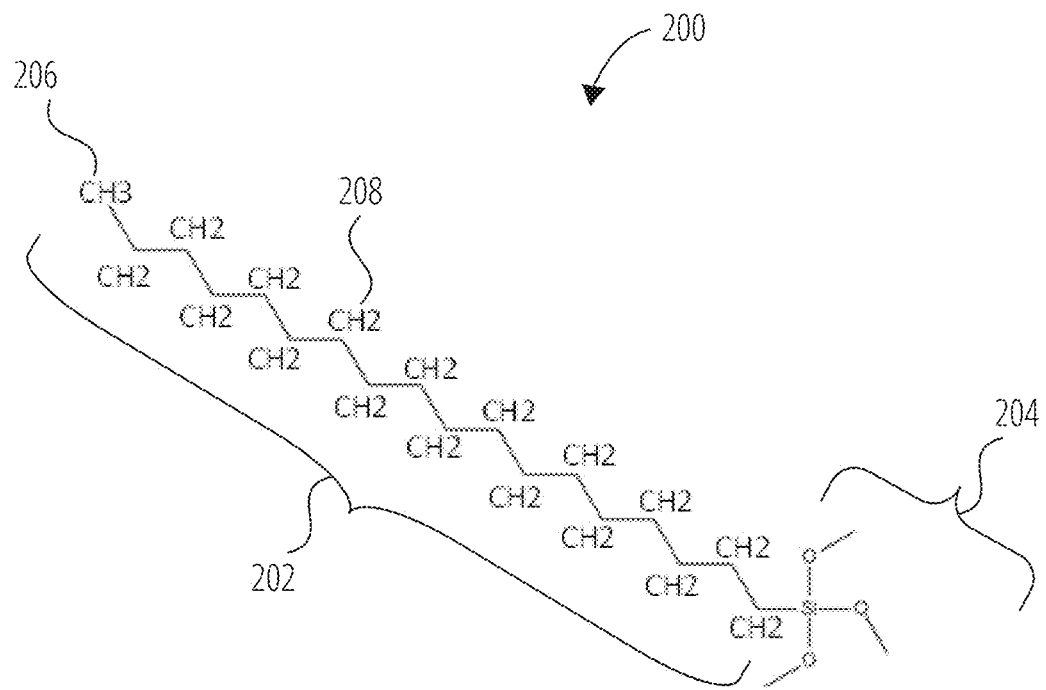
FIG. 2 illustrates a general molecular structure of an example silane molecule, in accordance with some examples.

FIG. 2, described below, shows the general molecular structure of an example silane molecule.

In some examples, the selected silane material may include an n-octadecyldimethylmethoxy silane, an n-octadecylmethyldimethoxy silane, an n-octadecyltrimethoxy silane, an n-octadecylmethyldiethoxy silane, an n-octadecyltriethoxyl silane, an octadecydimethyl(3-trimethoxysilyilpropyl)ammonium chloride, a 1,2-bis(trimethoxysilyl)decane, or a 1-n-decyl-1,1,3,3,3-pentamethoxy-1,3-disilapropane. Experimental testing of example LC mixtures including one or more of these silane materials indicates that these silane materials may exhibit one or more desirable properties when used in the manufacture of LC displays, as described below with reference to FIG. 3 through FIG. 9.

At operation 108, an amount of the silane material to be mixed with the LC material is determined. This amount may be determined based on the amount of the LC material to be used in the LC display: for example, the amount of the silane material may be selected as an amount of silane material constituting at least 0.8% by weight of the LC mixture resulting from mixture of the silane material with the LC material (described at operation 110 below). In some examples, the amount of the silane material may be selected as an amount of silane material constituting between and including 0.8% and 1.2% by weight of the LC mixture resulting from mixture of the silane material with the LC material. In some examples, the amount of the silane material may be selected as an amount of silane material constituting approximately or exactly 1% by weight of the LC mixture resulting from mixture of the silane material with the LC material. Experimental testing of example LC mixtures including approximately 1% silane material by weight indicates that these mixtures may exhibit one or more desirable properties when used in the manufacture of LC displays, as described below with reference to FIG. 3 through FIG. 9.

At operation 110, the amount of the silane material is mixed with the amount of the LC material to generate an LC mixture. In some examples, the LC mixture may also include one or more additional materials.

At operation 112, the LC mixture is heat treated in contact with a display substrate to bond at least a portion of the silane material to one or more surfaces of the display substrate, such that the silane material acts as a surfactant. In some examples, the display substrate includes one or more solid components of a display, such as a cover glass component, a circuit backplane, one or more electrodes, etc. In some examples, the display substrate may include one or more plastic components, with or without indium tin oxide (ITO) electrodes. Heat treatment may include baking the display, filled with the LC mixture in contact with the display substrate, at various suitable temperatures for various suitable lengths of time, such as 110 C for one hour, or between 105 C and 115 C for at least 50 minutes.

In some examples, the amount of the silane material is determined at operation 108 by estimating an amount of silane material that is likely to bond with the one or more surfaces of a display substrate during heat treatment, based at least in part on the display substrate. In some examples, a silane material is selected at operation 106 that does not significantly alter the properties or performance of the display even if some portion of the silane material remains mixed with the LC material after heat treatment. However, in some examples it may be desirable to only utilize a minimum amount of silane material such that all or substantially all of the silane material in the LC mixture will bond with the surfaces of the display substrate during heat treatment.

FIG. 2 shows a general molecular structure of an example silane molecule 200, comprising an alkyl chain 202 and three silane pendant groups 204. The alkyl chain 202 includes 18 carbon atoms in the form of a $CH_3$ group 206 and 17 $CH_2$ groups 208.

Experimental testing was performed to test the properties of nematic and chiral nematic TVAN LC displays using conventional baseline LC mixtures relative to the properties of such a display using an LC mixture as described in various examples herein, e.g., an LC mixture containing a relatively high amount of a highly hydrophobic silane to act as a surfactant. FIG. 3 through FIG. 9 show various results of that experimental testing, demonstrating potentially beneficial properties of the LC mixtures, LC displays, manufacturing methods, and other techniques described herein.

Figure 3:
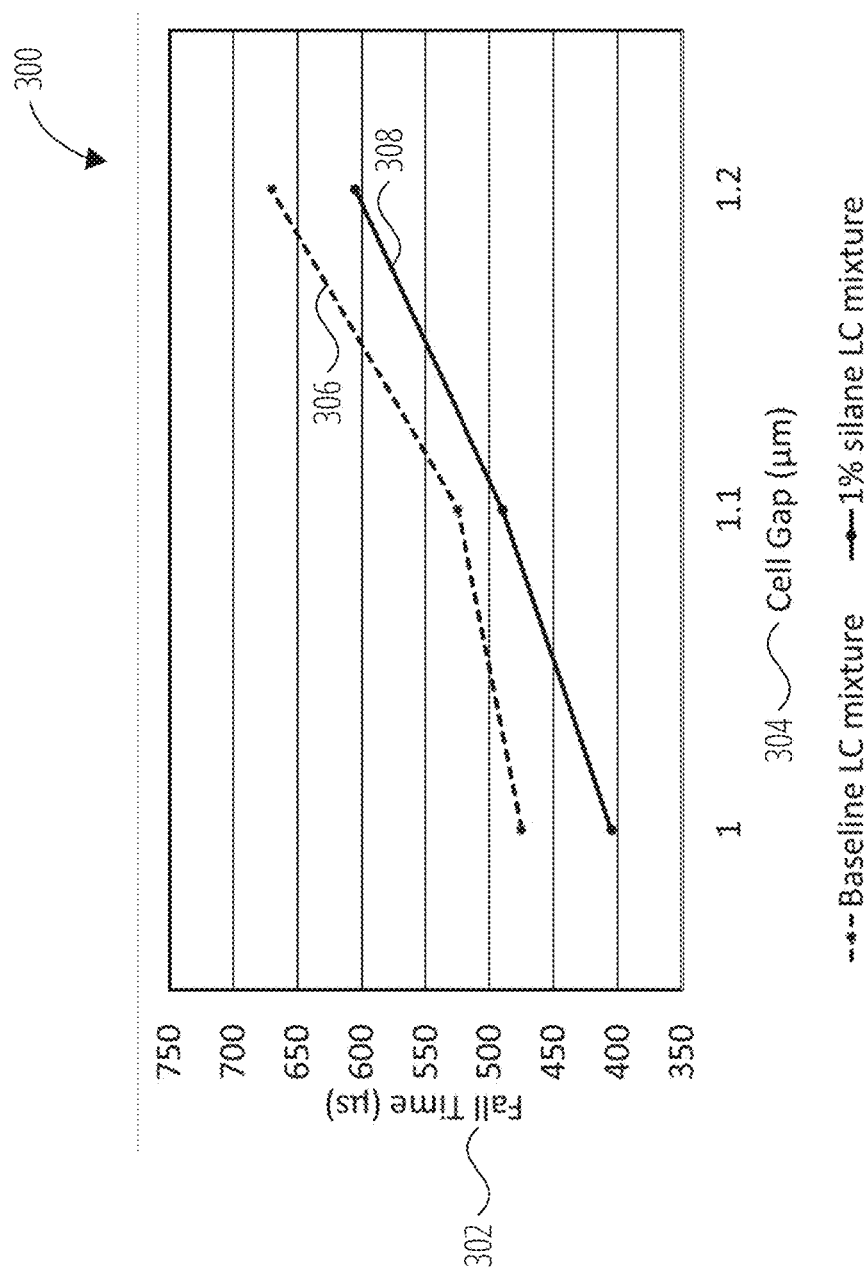
FIG. 3 illustrates a graph of the fall time of an LC display against the cell gap width of the display for a baseline LC mixture and a 1% silane LC mixture, in accordance with some examples.

FIG. 3 shows a graph 300 of the fall time 302 of an TVAN LC display against the cell gap 304 width of a tested display for a baseline LC mixture 306 and a 1% silane mixture 308. Two sets of displays were manufactured and tested, one using a baseline LC mixture 306 derived from a conventional, commercially available LC mixture, and one using an LC mixture containing approximately 1% silane material by weight, referred to herein as a 1% silane mixture 308. The baseline LC mixture 306 contained a smaller amount of silane material by weight than the 1% silane mixture 308. The 1% silane mixture 308 used a silane material selected from the set of silane materials identified herein.

The graph 300 shows that the display using the 1% silane mixture 308 exhibits a significantly faster switching speed than the display using the baseline LC mixture 306, as shown by fall time 302 of the LC material of the display (e.g., the time required for the LC material to relax when a drive voltage is removed). The fall time 302 of the 1% silane mixture 308 display is at least 30 µsec and usually more than 50 µsec faster at the measured cell gap 304 values of 1 µm to 1.2 µm. Further improvements to LC display performance using the 1% silane mixture 308 are shown in Table 1 below:

TABLE 1

| | LC display performance of display using 1% silane mixture 308 relative to display using baseline LC mixture 306 | | | | | |
|---|---|---|---|---|---|---|
| | Cell gap 1.0 µm | | Cell gap 1.1 µm | | Cell gap 1.2 µm | |
| | Baseline | 1% silane | Baseline | 1% silane | Baseline | 1% silane |
| Absolute Throughput % | 78.1 +/− 2.7 | 77.4 +/− 3.2 | 81.8 +/− 3.5 | 84.0 +/− 2.9 | 86.2 +/− 3.8 | 86.3 +/− 2.3 |
| Contrast | 4465 +/− 328 | 4435 +/− 418 | 1955 +/− 323 | 3321 +/− 623 | 1622 +/− 507 | 2698 +/− 103 |

TABLE 1-continued

LC display performance of display using 1% silane mixture
308 relative to display using baseline LC mixture 306

|  | Cell gap 1.0 μm | | Cell gap 1.1 μm | | Cell gap 1.2 μm | |
|---|---|---|---|---|---|---|
|  | Baseline | 1% silane | Baseline | 1% silane | Baseline | 1% silane |
| ON time (μsec) | 470 +/− 27 | 463 +/− 18 | 545 +/− 27 | 550 +/− 39 | 521 +/− 67 | 554 +/− 66 |
| Fall time (μsec) | 480 +/− 27 | 407 +/− 20 | 526 +/− 45 | 493 +/− 34 | 668 +/− 66 | 603 +/− 67 |

The data in Table 1 shows that the absolute throughput percentage and the on time (e.g., rise time of the LC in response to a drive voltage) of the two displays is not significantly different, whereas the 1% silane mixture 308 display exhibits significantly higher contrast at cell gaps of 1.1 μm and 1.2 μm and exhibits significantly faster fall time at all tested cell gap values.

Testing also demonstrated that the inclusion of a larger amount of a highly hydrophobic silane material in the LC mixture did not significantly degrade the voltage holding ratio (VHR) of the display, as shown in Table 2 below:

TABLE 2

Voltage holding ratio (VHR) of LC display using 1% silane mixture
308 relative to display using baseline LC mixture 306

|  | Cell gap 1.0 μm | | Cell gap 1.1 μm | | Cell gap 1.2 μm | |
|---|---|---|---|---|---|---|
|  | Baseline | 1% silane | Baseline | 1% silane | Baseline | 1% silane |
| VHR | (89.65 +/− 0.43) | (86.61 +/− 0.68) | (90.18 +/− 0.85) | (87.0 +/− 0.65) | (90.0 +/− 0.58) | (87.90 +/− 0.40) |

Experimental testing also demonstrated that the 1% silane mixture 308 resulted in displays exhibiting improved environmental stability. Specifically, the displays using the 1% silane mixture 308 exhibited improved stability of the LC material when exposed to high temperatures and high humidity over a prolonged period of time.

LC displays satisfying the required properties described above (e.g., using nematic liquid crystals or chiral nematic liquid crystals with a negative dielectric anisotropy, operating in a VAN or TVAN display mode, with high birefringence LC material and thin cell gaps) may exhibit instability in response to high temperatures and/or high humidity. For example, some such displays exhibit visible degradation of the LC material when exposed to a temperature of 42 C and a relative humidity (RH) of 92% for 96 hours—these conditions could be present in some environments, such as summer in some tropical climates, or in certain storage or transportation environments. Accordingly, experimental testing was performed to test the relative environmental stability of a 1% silane mixture 308 display relative to a baseline LC mixture 306 display.

Figure 4:
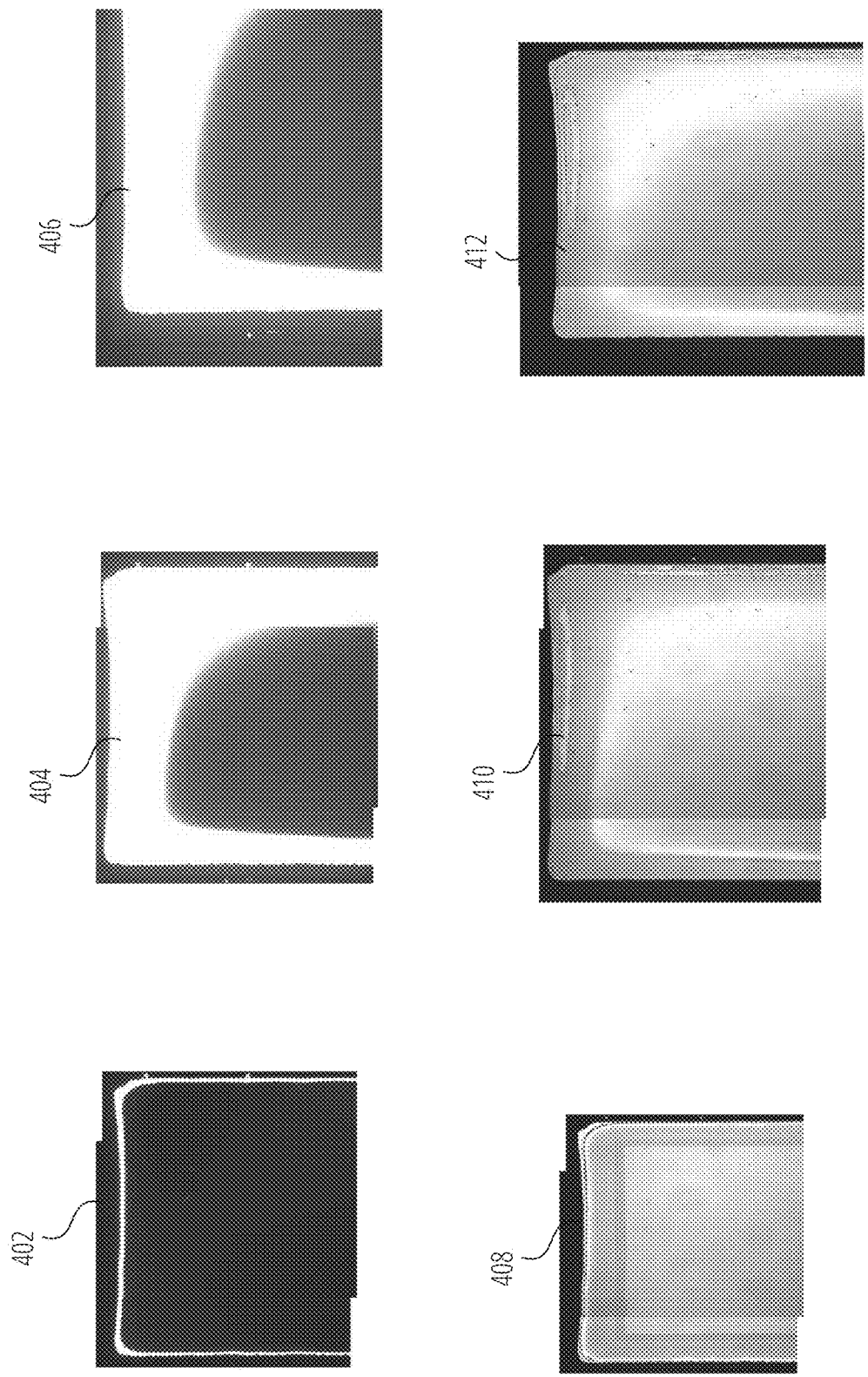
FIG. 4 illustrates display stability in a powered mode and an unpowered mode over a time course of 24 and 168 hours for a baseline LC mixture, in accordance with some examples.

FIG. 4 shows the environmental stability of a display using the baseline LC mixture 306, in a powered mode and an unpowered mode, while exposed to a temperature of 65 C and a relative humidity of greater than 90% over a time course of 168 hours. The top row shows the display in an unpowered state without voltage applied, and the bottom row shows the display in a powered state with a voltage applied. The first unpowered state 402 and first powered state 408, at hour 0 of the time course, show uniform LC performance over the area of the display. The second unpowered state 404 and second powered state 410, at hour 24 of the time course, show visible degradation of the LC performance around the perimeter of the display, especially in the top right corner. The third unpowered state 406 and third powered state 412, at hour 168 of the time course, show further visible degradation of LC performance. Thus, the baseline LC mixture 306 display exhibits significant environmental instability, with highly visible degradation after 24 hours of exposure to high temperature and high humidity conditions.

Figure 5:
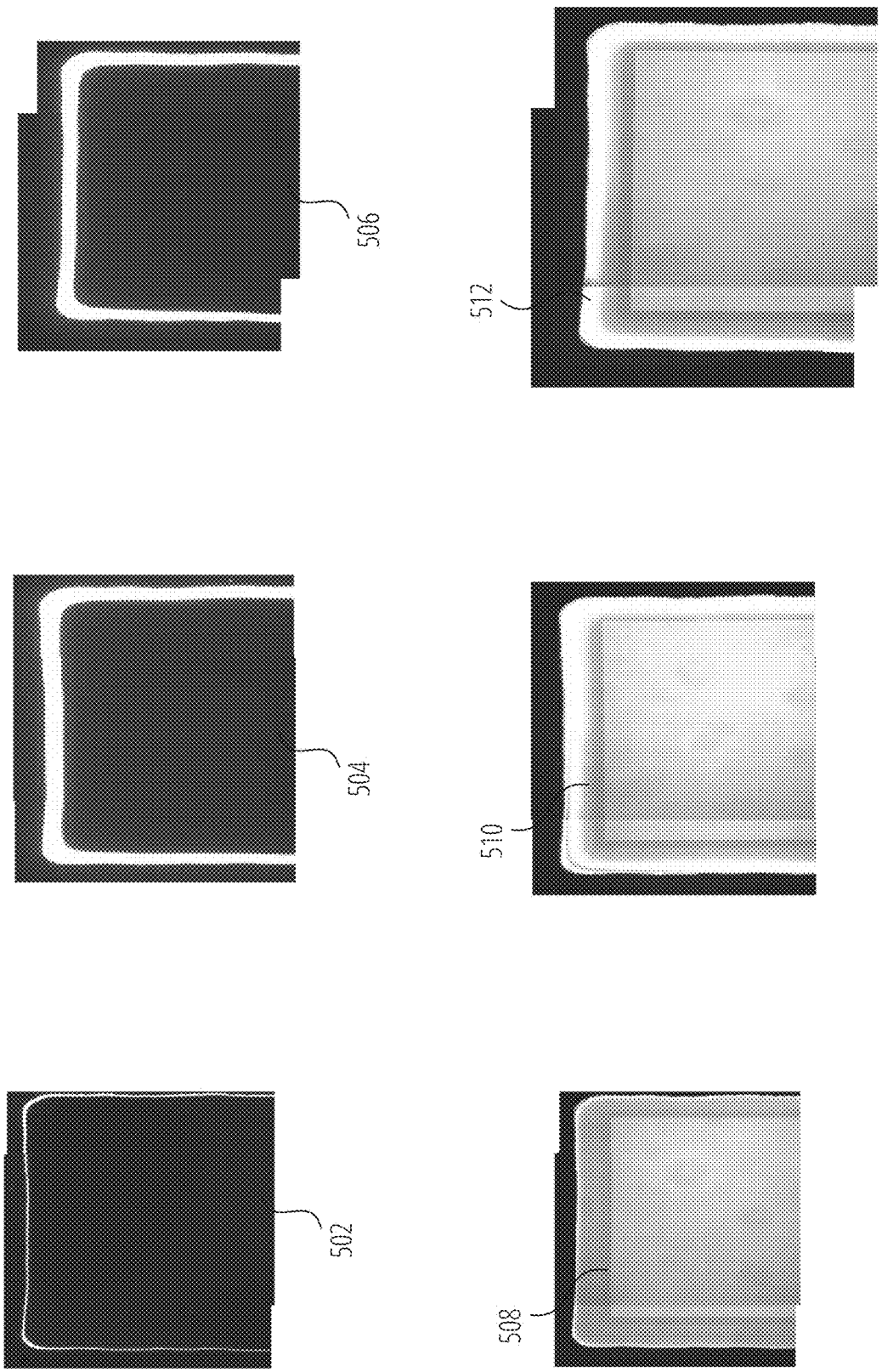
FIG. 5 illustrates display stability in a powered mode and an unpowered mode over the time course of FIG. 4 for a 1% silane LC mixture, in accordance with some examples.

FIG. 5 shows the environmental stability of a display using the 1% silane mixture 308, in a powered mode and an unpowered mode, while exposed to the same conditions (temperature of 65 C and relative humidity of greater than 90%) over the same time course (168 hours) as FIG. 4. Whereas the second unpowered state 504 and second powered state 510 show minor degradation around a thin portion of the display perimeter after 24 hours relative to the first unpowered state 502 and first powered state 508, this minor degradation may be obscured by an opaque border defining a display aperture in some designs. Furthermore, the third unpowered state 506 and third powered state 512 at hour 168 indicate no significant change in appearance compared with hour 24, demonstrating the long-term environmental stability of the 1% silane mixture 308 display even under extreme environmental conditions. In some tests, the 1% silane mixture 308 display exhibited stable performance even after exposure to 65 C and >90% RH conditions for more than 1000 hours.

In addition to improved contrast, fall time, and environmental stability, experimental testing also demonstrated that displays created using the 1% silane mixture 308 exhibited an increase in the anchoring transition temperature to the nematic-isotropic phase transition temperature or above. This may mean that such displays may be able to operate at higher temperatures and with better overall stability relative to displays created using the baseline LC mixture 306.

Figure 6:
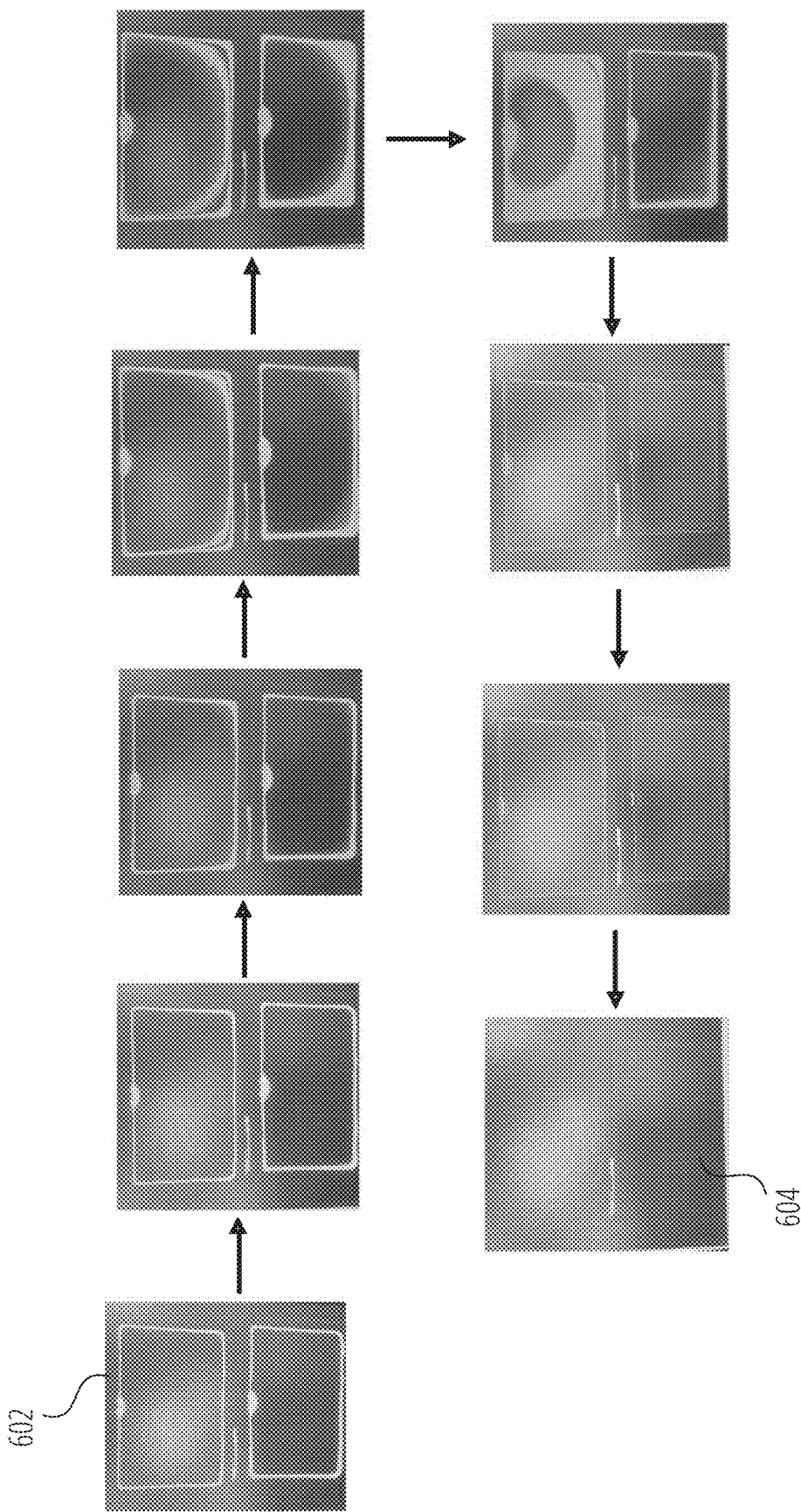
FIG. 6 illustrates display transition from a nematic phase to an isotropic phase over a temperature course of 98 C to 103 C for a baseline LC mixture, in accordance with some examples.

FIG. 6 shows a transition from a nematic phase to an isotropic phase of displays created using the baseline LC mixture 306 over a temperature course of 98 C to 103 C. Two such displays were tested and photographed in order to provide a redundant check and validation of the recorded results.

The images shown in FIG. 6 begin with an image of the two displays, created using the baseline LC mixture 306, in a nematic phase 602 at a temperature of 98 C. The arrows show the change in the visual appearance of the displays as the temperature increases, thereby causing a transition of the LC material of the displays from the nematic phase to the isotropic phase, ending in an isotropic phase 604 of the two displays at a temperature of 103 C. Substantial non-uniformity of the LC material across the area of the displays can be seen in the mid-transition images.

Figure 7:
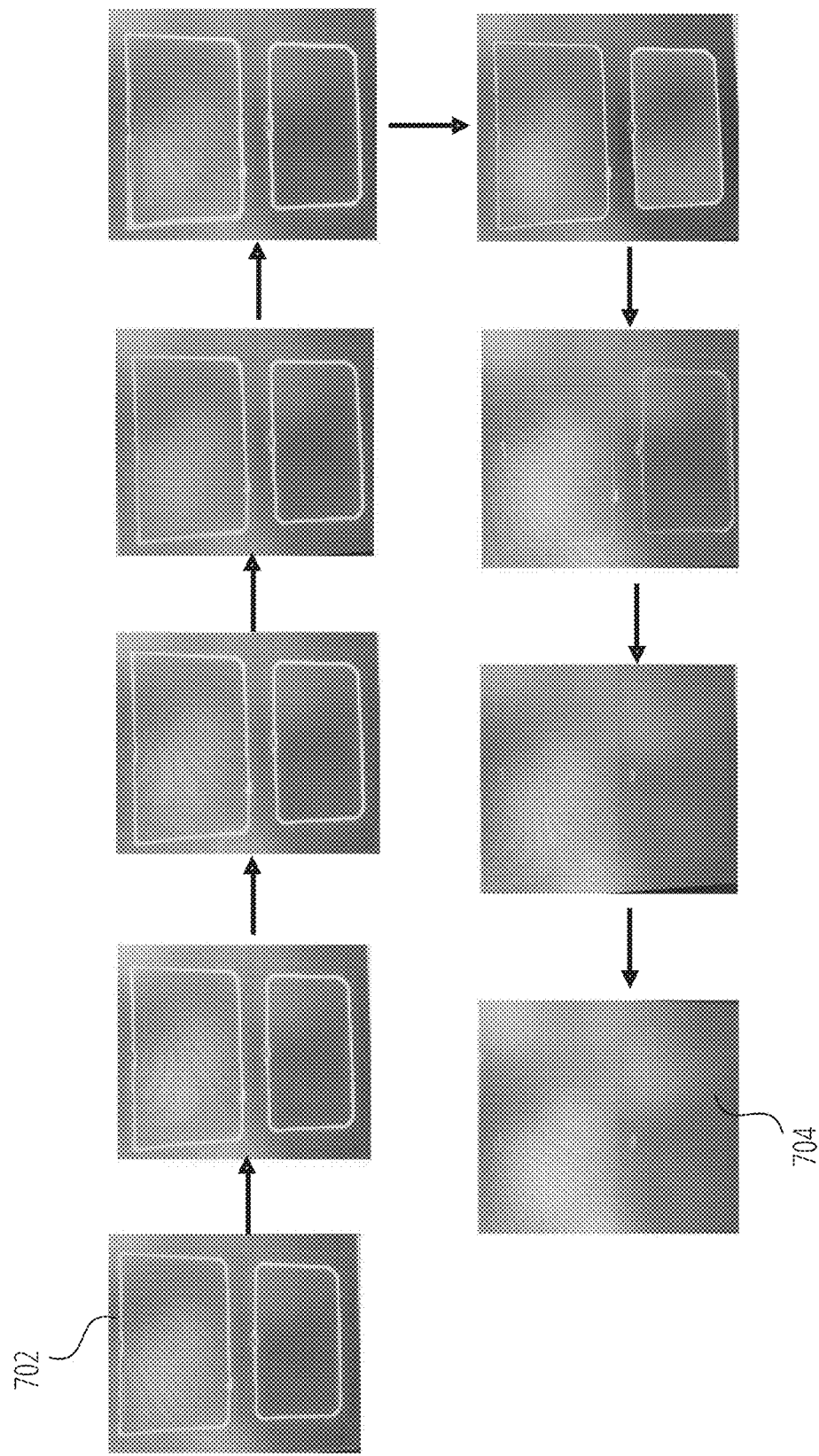
FIG. 7 illustrates display transition from a nematic phase to an isotropic phase over a temperature course of 98 C to 103 C for a 1% silane LC mixture, in accordance with some examples.

FIG. 7 shows a transition from a nematic phase to an isotropic phase of displays created using the 1% silane mixture 308 over the same temperature course as FIG. 6 (i.e., 98 C to 103 C). As in FIG. 6, two displays were tested and photographed.

The images shown in FIG. 7 begin with an image of the two displays, created using the 1% silane mixture 308, in a nematic phase 702 at a temperature of 98 C. As in FIG. 6, the arrows show the change in the visual appearance of the displays as the temperature increases, thereby causing a transition of the LC material of the displays from the nematic phase to the isotropic phase, ending in an isotropic phase 704 of the two displays at a temperature of 103 C. Relative to FIG. 6, the displays shown in FIG. 7 exhibit significantly improved uniformity and visual performance during the phase transition.

The phase transition of the two LC mixtures was also tested in the opposite direction, from the isotropic phase to the nematic phase.

Figure 8:
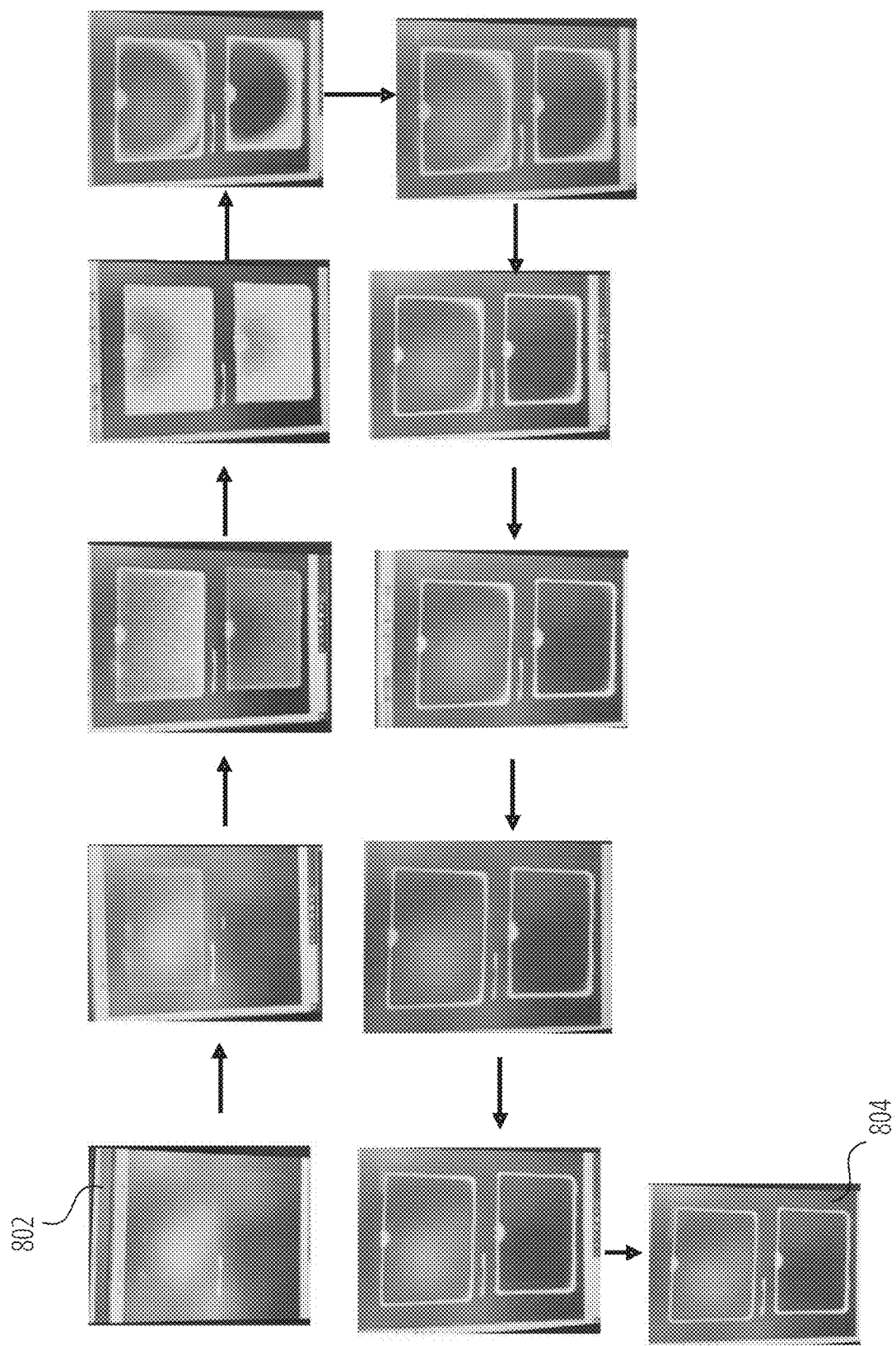
FIG. 8 illustrates display transition from an isotropic phase to a nematic phase over a temperature course of 105 C to 95 C for a baseline LC mixture, in accordance with some examples.

FIG. 8 shows a transition from an isotropic phase to a nematic phase of two displays created using the baseline LC mixture 306 over a temperature course of 105 C to 95 C. As the displays transition from the isotropic phase 802 to the nematic phase 804, significant nonuniformity and degradation of visual performance can be seen.

Figure 9:
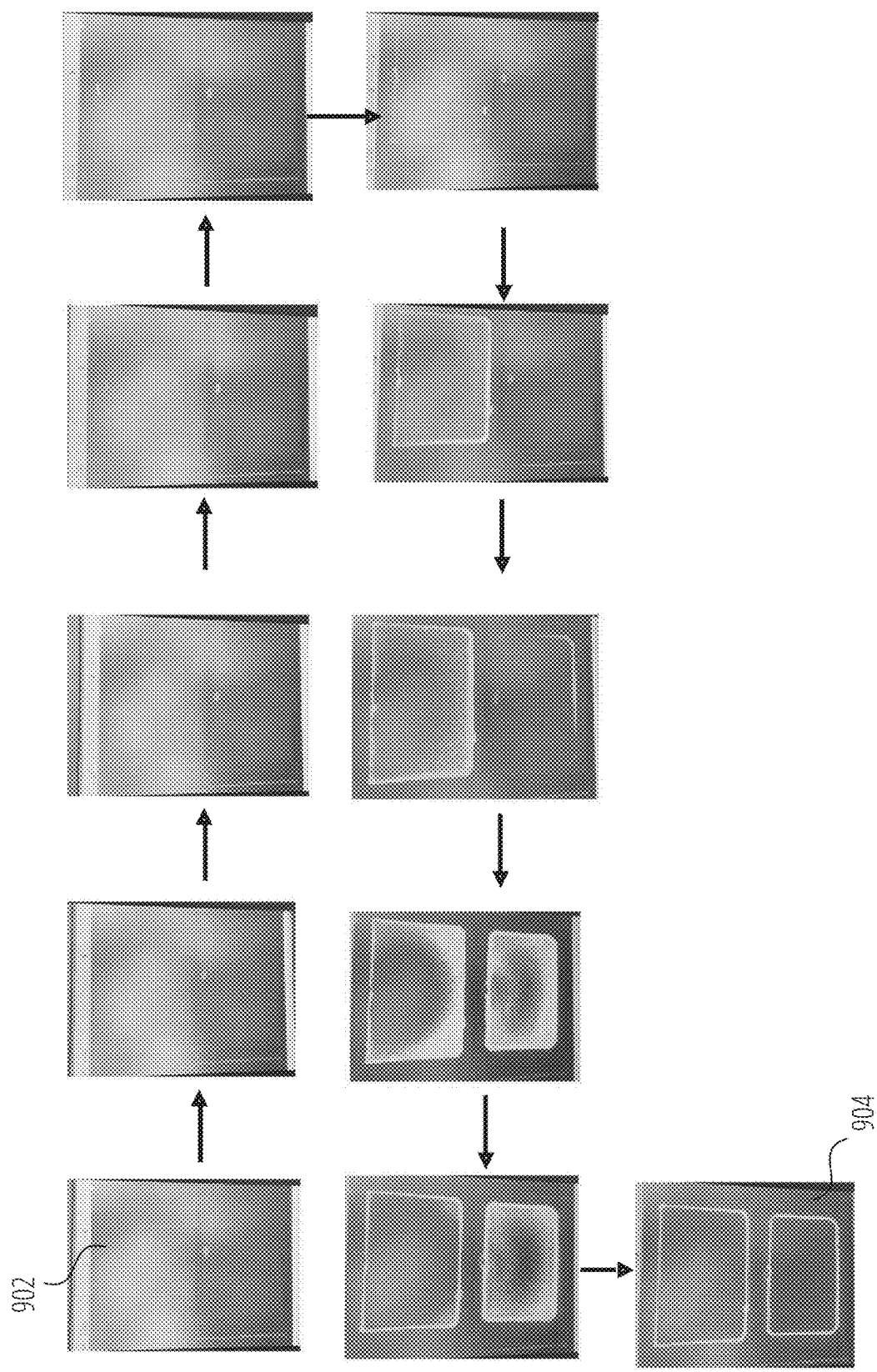
FIG. 9 illustrates display transition from an isotropic phase to a nematic phase over a temperature course of 105 C to 95 C for a 1% silane LC mixture, in accordance with some examples.

FIG. 9 shows the transition from the isotropic phase 902 to the nematic phase 904 of two displays created using the 1% silane mixture 308 over the temperature course of FIG. 8, i.e., 105 C to 95 C. As the displays transition from the isotropic phase 902 to the nematic phase 904, their visual performance and uniformity are significantly improved relative to the displays shown in FIG. 8.

In some examples, LC display manufacturing methods, LC mixtures, and LC displays are provided that may provide improved LC alignment quality and stability relative to conventional techniques or conditions.

Example 1 is a method for manufacturing a liquid crystal (LC) display, comprising: determining an amount of an LC material to be used in the LC display; based on the LC material and the amount of the LC material, determining: a silane material to be mixed with the LC material; and an amount of the silane material to be mixed with the LC material; mixing the amount of the silane material with the amount of the LC material to generate an LC mixture; and heat treating the LC mixture in contact with a display substrate to bond at least a portion of the silane material to one or more surfaces of the display substrate, such that the silane material acts as a surfactant.

In Example 2, the subject matter of Example 1 includes, wherein: determining the amount of the silane material to be mixed with the LC material comprises: determining an amount of the silane material constituting at least 0.8% of the LC mixture by weight.

In Example 3, the subject matter of Example 2 includes, wherein: determining the amount of the silane material to be mixed with the LC material comprises: determining an amount of the silane material constituting between and including 0.8% and 1.2% of the LC mixture by weight.

In Example 4, the subject matter of Examples 2-3 includes, wherein: determining the amount of the silane material to be mixed with the LC material comprises: determining an amount of the silane material that is likely to bond with the one or more substrate surfaces during heat treatment, based at least in part on the display substrate.

In Example 5, the subject matter of Examples 2-4 includes, wherein: heat treating the LC mixture comprises baking the LC mixture at a temperature between 105 C and 115 C for at least 50 minutes.

In Example 6, the subject matter of Examples 2-5 includes, wherein: the silane material comprises silane molecules having one or more silane pendant groups and an alkyl chain comprising or more carbon atoms.

In Example 7, the subject matter of Examples 2-6 includes, wherein: the silane material comprises: an n-octadecyldimethylmethoxy silane; an n-octadecylmethyldimethoxy silane; an n-octadecyltrimethoxy silane; an n-octadecylmethyldiethoxy silane; an n-octadecyltriethoxyl silane; an octadecyldimethyl(3-trimethoxysilyil-propyl)ammonium chloride; a 1,2-bis(trimethoxysilyl)decane; or a 1-n-decyl-1,1,3,3,3-pentamethoxy-1,3-disilapropane.

In Example 8, the subject matter of Example 7 includes, wherein: the silane material is an n-octadecyldimethylmethoxy silane.

In Example 9, the subject matter of Examples 7-8 includes, wherein: the silane material is an n-octadecylmethyldimethoxy silane.

In Example 10, the subject matter of Examples 7-9 includes, wherein: the silane material is an n-octadecyltrimethoxy silane.

In Example 11, the subject matter of Examples 7-10 includes, wherein: the silane material is an n-octadecylmethyldiethoxy silane.

In Example 12, the subject matter of Examples 7-11 includes, wherein: the silane material is an n-octadecyltricthoxyl silane.

In Example 13, the subject matter of Examples 7-12 includes, wherein: the silane material is an octadecydimethyl(3-trimethoxysilyil-propyl)ammonium chloride.

In Example 14, the subject matter of Examples 2-13 includes, wherein: the LC material comprises a nematic LC material or chiral nematic LC material with a negative dielectric anisotropy; and the LC display comprises a spatial light modulator configured to operate in a vertically aligned nematic (VAN) display mode.

In Example 15, the subject matter of Examples 2-14 includes, wherein: the LC material comprises a nematic LC material or chiral nematic LC material with a negative dielectric anisotropy; and the LC display comprises a spatial light modulator configured to operate in a twisted vertically aligned nematic (TVAN) display mode.

Example 16 is a liquid crystal (LC) mixture for use in an LC display, comprising: an amount of an LC material; and an amount of a silane material determined based on the LC material and the amount of the LC material.

In Example 17, the subject matter of Example 16 includes, wherein: the amount of the silane material is at least 0.8% of the LC mixture by weight.

In Example 18, the subject matter of Example 17 includes, wherein: the amount of the silane material is between and including 0.8% and 1.2% of the LC mixture by weight.

In Example 19, the subject matter of Examples 17-18 includes, wherein: the silane material comprises silane molecules having one or more silane pendant groups and an alkyl chain comprising or more carbon atoms.

In Example 20, the subject matter of Examples 17-19 includes, wherein: the silane material comprises: an n-octadecyldimethylmethoxy silane; an n-octadecylmethyldimethoxy silane; an n-octadecyltrimethoxy silane; an n-octadecylmethyldiethoxy silane; an n-octadecyltriethoxyl silane; an octadecydimethyl(3-trimethoxysilyil-propyl)ammonium chloride; a 1,2-bis(trimethoxysilyl)decane; or a 1-n-decyl-1,1,3,3,3-pentamethoxy-1,3-disilapropane.

In Example 21, the subject matter of Examples 17-20 includes, wherein: the LC material comprises a nematic LC material or chiral nematic LC material with a negative dielectric anisotropy; and the LC display comprises a spatial light modulator configured to operate in a vertically aligned nematic (VAN) display mode or a twisted vertically aligned nematic (TVAN) display mode.

Example 22 is a liquid crystal (LC) display, comprising: a nematic LC material or chiral nematic LC material with a negative dielectric anisotropy configured to operate in a vertically aligned nematic (VAN) display mode or a twisted vertically aligned nematic (TVAN) display mode; a display substrate configured to contain the nematic LC material or chiral nematic LC material; and a silane material bonded to one or more surfaces of the display substrate and positioned between the one or more surfaces and the nematic LC material or chiral nematic LC material, the silane material: being present in an amount such that a ratio of the amount of the silane material to an amount of the nematic LC material or chiral nematic LC material is between 0.8:99.2 and 1.2:98.8; and comprising: an n-octadecyldimethylmethoxy silane; an n-octadecylmethyldimethoxy silane; an n-octadecyltrimethoxy silane; an n-octadecylmethyldiethoxy silane; an n-octadecyltriethoxyl silane; an octadecydimethyl(3-trimethoxysilyil-propyl)ammonium chloride; a 1,2-bis(trimethoxysilyl)decane; or a 1-n-decyl-1,1,3,3,3-pentamethoxy-1,3-disilapropane.

Example 23 is at least one machine-readable medium including instructions that, when executed by processing circuitry, cause the processing circuitry to perform operations to implement any of Examples 1-22.

Example 24 is an apparatus comprising means to implement any of Examples 1-22.

Example 25 is a system to implement any of Examples 1-22.

Example 26 is a method to implement any of Examples 1-22.

Changes and modifications may be made to the disclosed examples without departing from the scope of the present disclosure. These and other changes or modifications are intended to be included within the scope of the present disclosure, as expressed in the following claims.

What is claimed is:

1. A method for manufacturing a liquid crystal (LC) display, comprising:
    determining an amount of an LC material to be used in the LC display;
    based on the LC material and the amount of the LC material, determining:
        a silane material to be mixed with the LC material; and
        an amount of the silane material to be mixed with the LC material;
    mixing the amount of the silane material with the amount of the LC material to generate an LC mixture, the silane material being present in an amount such that a ratio of the amount of the silane material to the amount of the LC material is between 0.8:99.2 and 1.2:98.8; and
    heat treating the LC mixture in contact with a display substrate to bond at least a portion of the silane material to one or more surfaces of the display substrate, such that the silane material acts as a surfactant.

2. The method of claim 1, wherein:
    determining the amount of the silane material to be mixed with the LC material comprises:
    determining an amount of the silane material that is likely to bond with the one or more substrate surfaces during heat treatment, based at least in part on the display substrate.

3. The method of claim 1, wherein:
    heat treating the LC mixture comprises baking the LC mixture at a temperature between 105 C and 115 C for at least 50 minutes.

4. The method of claim 1, wherein:
    the silane material comprises silane molecules having one or more silane pendant groups and an alkyl chain comprising or more carbon atoms.

5. The method of claim 1, wherein:
    the silane material comprises:
        an n-octadecyldimethylmethoxy silane;
        an n-octadecylmethyldimethoxy silane;
        an n-octadecyltrimethoxy silane;
        an n-octadecylmethyldiethoxy silane;
        an n-octadecyltriethoxyl silane;
        an octadecydimethyl(3-trimethoxysilyil-propyl)ammonium chloride;
        a 1,2-bis(trimethoxysilyl)decane; or
        a 1-n-decyl-1,1,3,3,3-pentamethoxy-1,3-disilapropane.

6. The method of claim 5, wherein:
    the silane material is an n-octadecyldimethylmethoxy silane.

7. The method of claim 5, wherein:
    the silane material is an n-octadecylmethyldimethoxy silane.

8. The method of claim 5, wherein:
    the silane material is an n-octadecyltrimethoxy silane.

9. The method of claim 5, wherein:
    the silane material is an n-octadecylmethyldiethoxy silane.

10. The method of claim 5, wherein:
    the silane material is an n-octadecyltriethoxyl silane.

11. The method of claim 5, wherein:
    the silane material is an octadecydimethyl(3-trimethoxysilyil-propyl)ammonium chloride.

12. The method of claim 1, wherein:
    the LC material comprises a nematic LC material or chiral nematic LC material with a negative dielectric anisotropy; and
    the LC display comprises a spatial light modulator configured to operate in a vertically aligned nematic (VAN) display mode.

13. The method of claim 1, wherein:
    the LC material comprises a nematic LC material or chiral nematic LC material with a negative dielectric anisotropy; and
    the LC display comprises a spatial light modulator configured to operate in a twisted vertically aligned nematic (TVAN) display mode.

14. A liquid crystal (LC) mixture for use in an LC display, comprising:
    an amount of an LC material; and
    an amount of a silane material determined based on the LC material and the amount of the LC material, the silane material being present in an amount such that a ratio of the amount of the silane material to the amount of the LC material is between 0.8:99.2 and 1.2:98.8.

15. The LC mixture of claim 14, wherein:
the silane material comprises silane molecules having one or more silane pendant groups and an alkyl chain comprising or more carbon atoms.

16. The LC mixture of claim 14, wherein:
the silane material comprises:
- an n-octadecyldimethylmethoxy silane;
- an n-octadecylmethyldimethoxy silane;
- an n-octadecyltrimethoxy silane;
- an n-octadecylmethyldiethoxy silane;
- an n-octadecyltriethoxyl silane;
- an octadecydimethyl(3-trimethoxysilyil-propyl)ammonium chloride;
- a 1,2-bis(trimethoxysilyl)decane; or
- a 1-n-decyl-1,1,3,3,3-pentamethoxy-1,3-disilapropane.

17. The LC mixture of claim 14, wherein:
the LC material comprises a nematic LC material or chiral nematic LC material with a negative dielectric anisotropy; and
the LC display comprises a spatial light modulator configured to operate in a vertically aligned nematic (VAN) display mode or a twisted vertically aligned nematic (TVAN) display mode.

18. A liquid crystal (LC) display, comprising:
a nematic LC material or chiral nematic LC material with a negative dielectric anisotropy configured to operate in a vertically aligned nematic (VAN) display mode or a twisted vertically aligned nematic (TVAN) display mode;
a display substrate configured to contain the nematic LC material or chiral nematic LC material; and
a silane material bonded to one or more surfaces of the display substrate and positioned between the one or more surfaces and the nematic LC material or chiral nematic LC material, the silane material:
being present in an amount such that a ratio of the amount of the silane material to an amount of the nematic LC material or chiral nematic LC material is between 0.8:99.2 and 1.2:98.8; and
comprising:
- an n-octadecyldimethylmethoxy silane;
- an n-octadecylmethyldimethoxy silane;
- an n-octadecyltrimethoxy silane;
- an n-octadecylmethyldiethoxy silane;
- an n-octadecyltriethoxyl silane;
- an octadecydimethyl(3-trimethoxysilyil-propyl)ammonium chloride;
- a 1,2-bis(trimethoxysilyl)decane; or
- a 1-n-decyl-1,1,3,3,3-pentamethoxy-1,3-disilapropane.

19. The LC display of claim 18, wherein:
the silane material is an n-octadecyldimethylmethoxy silane.

20. The LC display of claim 18, wherein:
the silane material is an n-octadecylmethyldimethoxy silane.

* * * * *